Nov. 8, 1932.　　　　F. B. PFEIFFER　　　　1,887,187
APPARATUS FOR BUILDING TIRE CARCASSES
Filed Aug. 7, 1929　　3 Sheets-Sheet 1
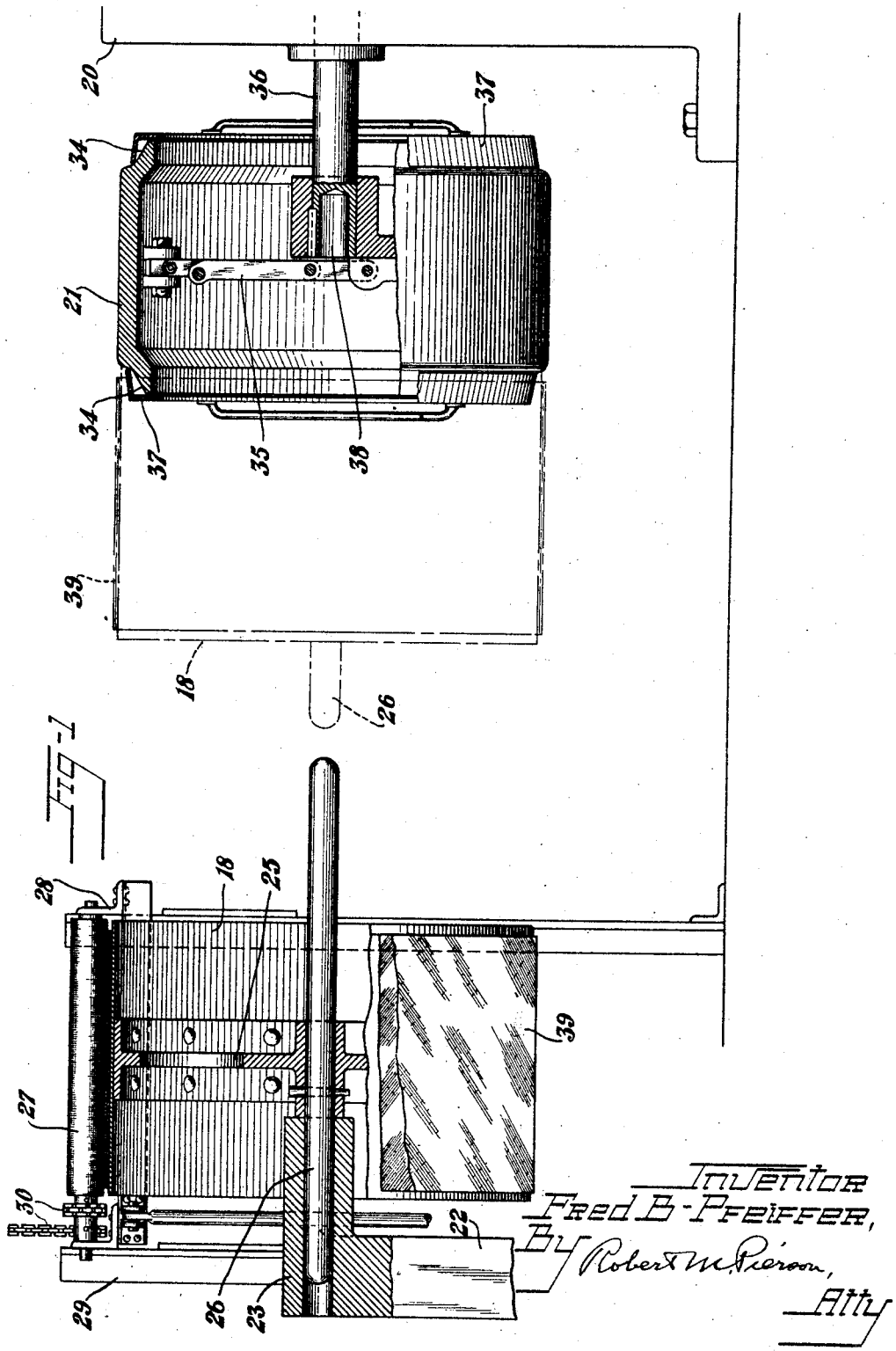

Nov. 8, 1932. F. B. PFEIFFER 1,887,187
APPARATUS FOR BUILDING TIRE CARCASSES
Filed Aug. 7, 1929   3 Sheets-Sheet 2
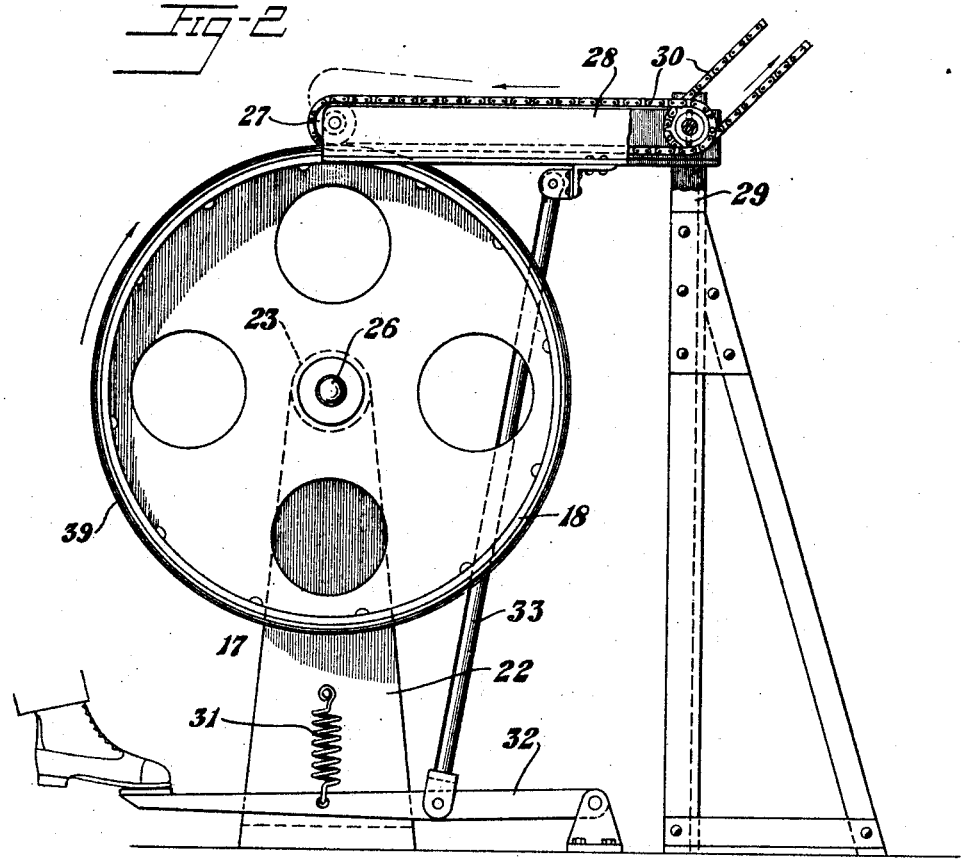
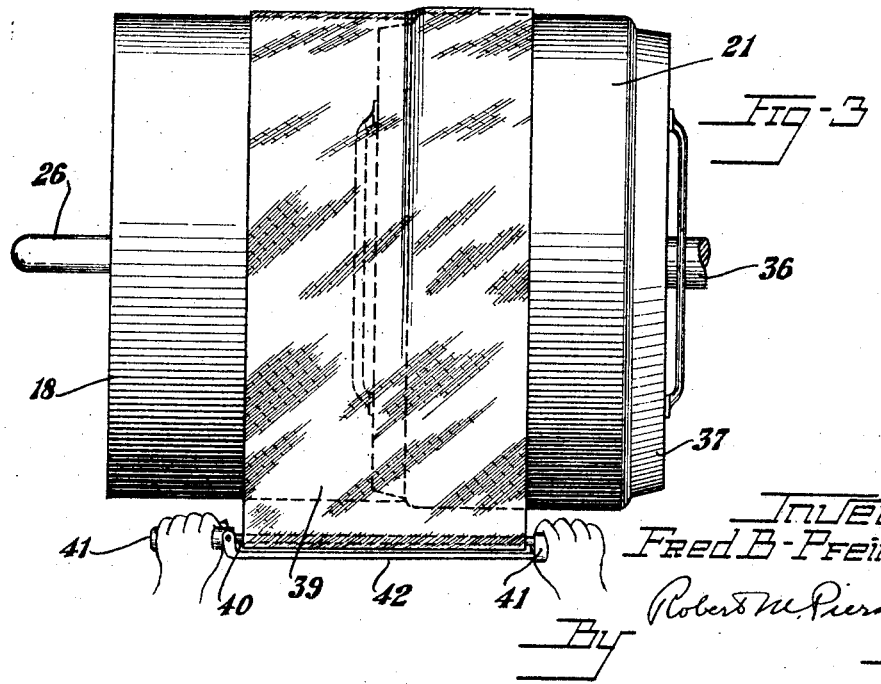
Inventor
Fred B. Pfeiffer,
By Robert M. Pierson,
Atty.

Nov. 8, 1932.   F. B. PFEIFFER   1,887,187
APPARATUS FOR BUILDING TIRE CARCASSES
Filed Aug. 7, 1929   3 Sheets-Sheet 3
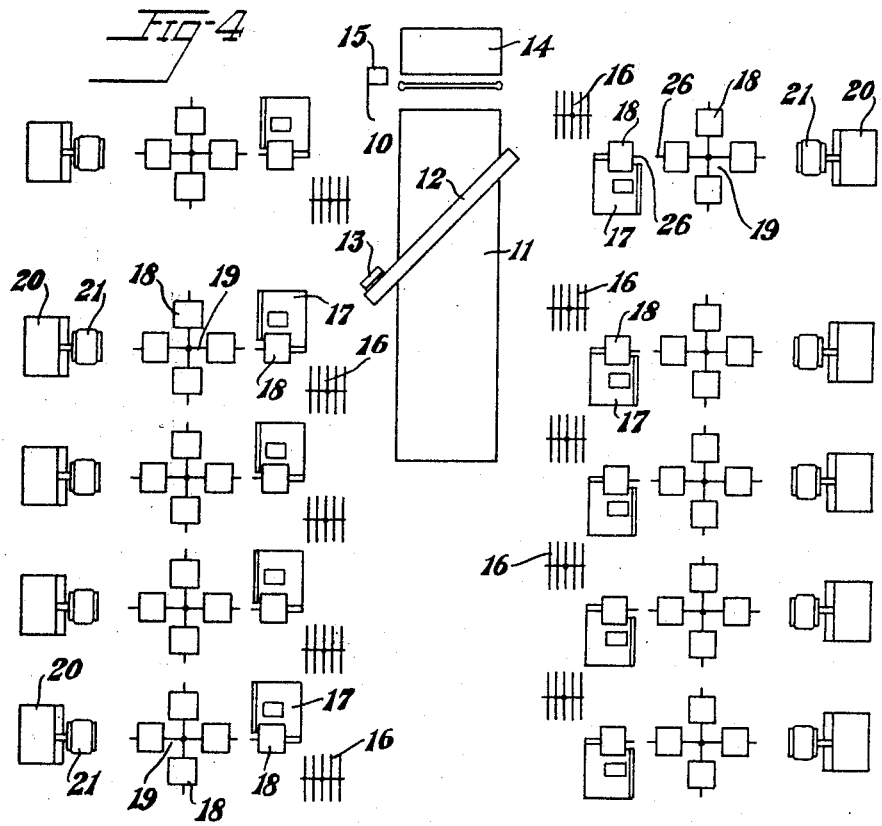
Inventor
FRED B. PFEIFFER
By Robert M. Pierson,
Atty.

Patented Nov. 8, 1932

1,887,187

UNITED STATES PATENT OFFICE

FRED B. PFEIFFER, OF AKRON, OHIO, ASSIGNOR TO SEIBERLING RUBBER COMPANY, OF BARBERTON, OHIO, A CORPORATION OF DELAWARE

APPARATUS FOR BUILDING TIRE CARCASSES

Application filed August 7, 1929. Serial No. 384,027.

This invention relates to the manufacture of pneumatic tires, and particularly to apparatus employed in building up the body or carcass of a tire casing or of a flat or semi-flat band for forming a tire casing.

My objects are to effect economies in labor and material cost in this field, and to improve the quality and uniformity of the product.

In the manufacture of cord tires, a long length of cord fabric is rubberized in a calender, rolled with a liner, and then cut diagonally of the threads into shorter lengths on a bias-cutter. It has been common practice to make these lengths into a band which is stretched over the tire-shaped core, or over a semi-flat form known as the drum or pulley, of a tire-building machine; although sometimes the plies of carcass fabric are wrapped directly onto the core or form without first making them into a band, especially with clincher-bead and the smaller sizes of inextensible-bead tires. The bead-cores are incorporated in the edges, said edges are bound with fabric chafing strips, and after the beaded carcass has been made, the tread rubber and side-wall rubber are added while the carcass is still on said core or drum.

After the rubberized fabric is cut to width from the large calender roll, it has commonly been stored in liners for some time and then delivered direct to the tire-builder or else made into bands as described, and these bands are stored in flat condition with liners on the inside and between adjacent bands to keep them from sticking together, before being made up into tires.

Prior methods have thus involved the use of expensive liners or separators, a large stock of material in process, floor space and facilities for storing, deterioration of stock due to dirt, age and light, loss of tackiness necessary for good workmanship, extreme care in handling and storage in order to avoid crumpling, and uneven shrinkage which make it difficult to deliver to the tire-builder a band of specified width and length and often results in a wrong angle of cord and non-uniform ply lapping at the beads.

These objections are obviated in my present invention, which dispenses with the use of liners, including those which have heretofore been used for storage of bands, and substitutes a novel system of transfer and direct utilization of the rubberized fabric from the bias cutter to the tire-building form, thereby effecting numerous economies in tire building, and improving the quality and uniformity of the product.

Of the accompanying drawings, Fig. 1 is a side elevation, partly in section, showing a band-building and transferring apparatus embodying my invention.

Fig. 2 is an end elevation showing the principal elements of the band-builder.

Fig. 3 is a plan view illustrating the method of transferring a band from the band-building drum to the tire form with which said drum is temporarily associated.

Fig. 4 is a diagrammatic view illustrating the floor plan or layout of a manufacturing unit including a bias cutter, together with band-builders, tire-building machines and associated apparatus for manufacturing the carcasses of tires by the semi-flat building method in accordance with one embodiment of my invention.

Referring at first to the embodiment illustrated in Figs. 1 to 4, 10 in Fig. 4 is a bias fabric-cutting machine which may be of the type described in my prior application, Serial No. 285,555 filed June 15, 1928, said machine including a table 11, a track-way 12 diagonally placed thereover, a rotary cutter and driving motor 13 adapted to travel across the table on said track-way, a fabric supply roll 14 and a step-by-step fabric feeder 15 of variable throw. This cutter is adapted to cut off lengths of bias rubberized fabric, the widths of which may be quickly varied to obtain the desired ply widths for different tires or to vary the ply widths in the same tire by adjustment of the fabric feeder 15.

A single one of these bias cutters is adapted to serve a large number of tire-building sub-units, ten, for example, in the illustration given, said sub-units including apparatus for preparing the lengths of bias fabric and incorporating them in tire carcasses, such sub-units being here shown as placed in two groups on opposite sides of the bias cutter 10 and closely adjacent thereto, each group containing the necessary instrumentalities arranged in rows. In the first row are the racks 16 for hanging the lengths of bias fabric which are taken off the cutter table 11 and transferred to said racks by an attendant. In the next row are stands 17 including the rotary band-building drums 18 employed in this embodiment of the invention. In the third row are turret drum racks 19 for receiving the drums with the bands thereon from the band-building operator and making them available to the tire-building operator and in the outer row are the tire-building stands or machines 20 with their permanently-mounted, collapsible, rotary tire-building forms 21 of the semi-flat band type. There are narrow aisles between each of the sub-units, and between the bias cutter 10 and those fabric racks 16 which are located opposite said bias cutter, and each of the band-building stands 17 is within easy reach of a fabric rack on one side and a drum turret 19 on the other side, while the corresponding tire machine 20 is within easy reach of the drum turret 19.

The band-building apparatus or stand 17, as shown in Figs. 1 and 2, consists essentially of a standard 22 provided at its upper end with a horizontal bearing 23, a cylindrical band-building drum 18 journaled to rotate freely on the standard 22 and having an internal spider 25 and a central shaft or journal member 26 mounted to turn in the bearing 23 and normally free to be withdrawn endwise therefrom. By extending the shaft 26 to provide journals at both ends of the drum as shown, I provide for transferring said drum directly across the intervening space and associating it with the tire-building form 21 as indicated in Fig. 1 or for transferring it directly across and associating it with the turret rack 19 to be later associated with the tire-building form, without in either case having to reverse the drum in effecting such transfer.

The band builder may also include, as shown in Figs. 1 and 2, a power-driven roller 27 for rotating the drum 18 through the medium of tire material such as a strip of cushion gum which is adapted to be fed onto such drum or onto carcass fabric wrapped on the drum, over said roller. The roller is mounted for movement toward and away from the drum by being journaled on a frame 28 pivoted to a standard 29, and has chain-and-sprocket gearing 30 associated therewith for rotating the roller, the elevation of the said frame being accomplished by a spring 31, and its depression by a pedal-lever 32, with which said spring is connected, and an intermediate link or connecting rod 33. The strip feeder is not claimed as a part of my invention.

The carcass-building machine 20 includes a semi-flat form or drum 21 of known type which has depressed marginal bead seats 34 and may be made as usual in segments so as to be collapsible, said form having an internal chuck 35 or means for supporting the segments and operating the key segment, and said chuck being permanently mounted on a rotary shaft 36. Detachable guide rings 37 are shown associated with the margins of the form for application thereon after the first or inner carcass band has been placed on the form to aid in concentrically locating the bead cores. The band-building drum 18 is usually made slightly smaller in diameter than the corresponding carcass-building form 21, so that the carcass band will require stretching to place it on the form and its edges which are to form the beads will then contract to or toward the bead seats on the form 21 or against the bead cores which have been located on a previously-placed carcass band and will require but little fulling or stitching-in to avoid wrinkles. I may, however, make the drum 18 of substantially the same diameter as the body of the form 21, and rely entirely on a stitching-in operation to shorten the edges of the plies. The use of a cylindrical band-building drum facilitates the splicing of the ends of each fabric ply over its whole width as compared with making the band on a semi-flat form such as 21.

The outer end of shaft 36 is formed with a coupling socket 38 to receive the end of journal shaft 26 on the drum 18 and maintain said drum in axial alignment with the building from 21. The ends of the arms of the turret rack 19 are formed with similar sockets, as will be understood without special illustration.

In the operation of this embodiment of my invention, the strips of bias-cut carcass fabric are taken from the table 11 of the cutting machine by an attendant and placed upon the various racks 16 within convenient reach of the operators at the band-building stands 17, each operator taking strips successively and wrapping them about the drum 18 while turning said drum by hand to form a carcass band 39 thereon of the exact length required and generally of two-ply construction with the threads in one ply at an opposite angle to those in the adjacent ply. If inter-ply strips of cushion gum are to be incorporated in the band they are rolled on with the aid of the feed roller 27. When a band has been completed, the drum 18, with the band thereon, is transferred directly across without turning it end-for-end and placed on one of the arms of the turret rack 19 and the operator then takes an empty drum from another arm of said rack and proceeds to build another carcass band, which may be of a different width from the first band, to facilitate bead formation at the carcass edges, these bands of different widths being conveniently alternated on the arms of the turret racks.

The tire-machine operator takes a drum 18 with its band from the turret rack, inserts its journal in the socket 38 of shaft 36 to support said drum and align it with the tire form 28, and then works the carcass band 39 off from the drum 18 onto the form 21 while said form and drum are being rotated, with a progressive local stretching of the band accompanied by axial movement thereof. This operation is illustrated in Fig. 3 and may be accomplished with the aid of a suitable tool known in the art, such as a thin, pointed rod or the hand roller 40 shown in this view, equipped with handles 41 and a guard or keeper 42. When the band has been fully worked onto the form, the rotation of the latter is stopped, the hand tool is withdrawn, and the tension of the band may be equalized by hand in the usual manner. The operator then restores the empty drum 18 to one of the arms of the turret rack 19 and proceeds with the building up of the carcass and the complete tire-forming band with a plurality of carcass bands 39 and auxiliary materials, including flippered bead cores, bead chafer strips, side-wall rubber and tread rubber; these components being manipulated and rolled into firm adhesion with each other in a known manner.

This band-transferring means may also be used with tire machines having tire-shaped cores, and any suitable modification of the devices for associating the drum 18 with such a core may be effected if required.

The above described system of tire building increases production and gives better results than methods formerly employed, in that it provides for direct and continuous progress of the carcass materials from the bias cutter through the stages of band-building and incorporation in a flat or semi-flat or tire-shaped carcass on a tire machine. There is no intermediate storage of the carcass-forming strips or of the carcass-forming bands in cloth liners, but the rubberized strips are taken from the bias cutter while they retain substantially their original tackiness, are directly made up into a band of transversely-flat, circular shape and of the exact length required, brought in that shape and length to the tire-building form, transferred to said form and there incorporated in the carcass. Hence the maximum adhesion of the plies is obtained, and the evils of uneven shrinkage, crumpling and distortion from lying unevenly in liners, accumulation of dirt, and deterioration from other causes are avoided. It will be apparent that many of the advantages of the described band-building and transfer system would be obtained even if the bias-cut fabric were stored in liners in the usual manner, before being made into bands.

It will be understood that the described features of construction and the several steps in the process may be variously modified without departing from the scope of my invention as defined in the claims. The herein-disclosed method is made the subject of my divisional application Ser. No. 491,947, filed Oct. 29, 1930.

I claim:

1. Pneumatic-tire building apparatus comprising a rotary carcass-building form, a band-building drum, and means for demountably supporting said drum in band-transferring relation to said form.

2. Pneumatic-tire building apparatus comprising a rotary carcass-building form, and a band-building drum of smaller diameter, supported in band-transferring alignment with said form, immediately adjacent the latter.

3. Pneumatic-tire building apparatus comprising a rotary carcass-building form, means for supporting a band-building drum in axially-aligned band-transferring relation thereto, an adjacent drum-standard, and a band-building drum detachably journaled on said standard and adapted for mounting in said relation to the form.

4. Pneumatic-tire building apparatus comprising a rotary carcass-building form having a shaft provided with a coupling, and a band-building drum aligned in band-transferring relation to said form and having a central supporting member detachably engaging said coupling.

5. Pneumatic-tire building apparatus comprising a drum stand, a rotary carcass-building device adjacent thereto, and a band-building drum engageable by one end with said stand and by the other end with said device.

6. Pneumatic-tire building apparatus comprising a drum stand, a rotary carcass-building device located adjacent thereto and formed to receive band drums, a rotary turret drum rack interposed between the two and formed to receive band drums, and a band-building drum adapted to rotate on said stand and formed for association with said turret rack and said carcass building device.

7. Pneumatic-tire building apparatus comprising a drum stand having a bearing, a rotary carcass-building form adjacent thereto, a supporting shaft for said form provided with a coupling socket at its outer end, an intermediate rotary turret rack, and a band-building drum having a journal at one end mountable in said bearing and in said socket, and a journal at the opposite end mountable in said turret rack.

In witness whereof I have hereunto set my hand this 2nd day of August, 1929.

FRED B. PFEIFFER.